United States Patent [19]

Green

[11] 4,092,443
[45] May 30, 1978

[54] METHOD FOR MAKING REINFORCED COMPOSITES

[75] Inventor: George Edward Green, Stapleford, England

[73] Assignee: Ciba-Geigy Corporation, Ardsley, N.Y.

[21] Appl. No.: 767,268

[22] Filed: Feb. 10, 1977

[30] Foreign Application Priority Data

Feb. 19, 1976  United Kingdom .................. 6528/76
Feb. 19, 1976  United Kingdom .................. 6575/76

[51] Int. Cl.$^2$ ............................................. B05D 3/06
[52] U.S. Cl. .................................. 427/53; 260/23 EP; 260/837 R; 427/54; 204/159.11; 204/159.22; 204/159.23
[58] Field of Search ............... 260/836, 837 R, 23 EP; 427/54, 53; 204/159.11, 159.22, 159.23

[56] References Cited

U.S. PATENT DOCUMENTS

| | | | |
|---|---|---|---|
| 3,246,054 | 4/1966 | Guenther et al. | 427/44 |
| 3,441,543 | 4/1969 | Heilman | 427/44 |
| 3,450,613 | 6/1969 | Steinberg | 427/54 |
| 3,935,330 | 1/1976 | Smith et al. | 427/54 |
| 3,937,855 | 2/1976 | Gruenwald | 427/54 |
| 4,017,453 | 4/1977 | Heilman et al. | 260/837 R |
| 4,025,407 | 5/1977 | Chang et al. | 427/54 |

*Primary Examiner*—John H. Newsome
*Attorney, Agent, or Firm*—Vincent J. Cavalieri

[57] ABSTRACT

A method for the preparation of prepregs comprises
  i. impregnating a fibrous reinforcing material with a liquid composition containing an epoxide resin, a photopolymerizable compound, and with a heat-activated curing agent for epoxide resins, and
  ii. in the absence of a substance which gives rise to a substantial degree of photoinduced polymerization through consumption of epoxide groups, exposing the impregnated material to actinic radiation such that the composition solidifies due to photopolymerization of the said photopolymerizable compound while the epoxide resin remains substantially in the thermosettable state.

Preferably the liquid composition also contains a dual-functional substance which has in the same molecule both an epoxide group and a dissimilar group through which the substance can be photopolymerized. The prepreg, optionally after shaping and/or stacking, is heated to cure the epoxide resin and, if used, the photopolymerized dual-functional substance.

11 Claims, No Drawings

METHOD FOR MAKING REINFORCED COMPOSITES

BACKGROUND OF THE INVENTION

This invention relates to a method for the production of reinforced composites from compositions which are photopolymerisable and thermosettable and from fibrous reinforcing materials, and to the composites obtained by this method.

Composite structures are commonly made by impregnating fibrous materials, such as paper, glass, and carbon fibres, with a solution of a solid thermosettable resin and a heat-activated curing agent for the resin, causing the resin to solidify by evaporation of the solvent, and, when desired, curing the resin composition by the action of heat. Composite structures may also be prepared from films of a thermosettable resin composition by laying a film of the resin composition on a fibrous reinforcement and applying heat and pressure so that the resin composition flows about the fibres but remains curable, and then heating further when desired so that the resin composition is cured by the heat-activated curing agent.

Both these methods suffer from certain drawbacks. If a solvent is used, it is not always possible to eliminate all traces of it before the final curing takes place, and in consequence the final composite may contain voids caused by evaporation of such residual solvent. Further, use of solvents may cause difficulties due to their toxicity or inflammability or to pollution. When a film adhesive is used, it must first be cast from a liquid thermosettable resin and this then advanced to the solid state, and such a process adds considerably to the cost of the composite. Both methods also require a considerable expenditure of heat energy, either to evaporate the solvents or to advance the resin.

Japanese published patent application No. 113498/72 disclosed a process in which glass fibres were impregnated with glycidyl methacrylate or glycidyl acrylate in the presence of a ring-opening catalyst, optionally also with other vinyl monomers or prepolymers, the fibres were subjected to irradiation at low temperature with an ionising radiation or light, and then the composite was heated to cure it. In the examples, glasscloth impregnated with glycidyl methacrylate is subjected to gamma radiation from $^{60}$Co at from $4 \times 10^5$ R/hour to $1 \times 10^6$ R/hour for 1½ to 3 hours. Use of light to induce polymerisation is not discussed, other than to say that visible or ultra-violet light may be employed. The need to apply gamma or similar ionising radiation for such prolonged periods clearly limits the industrial usefulness of the process.

We have now found a method by which reinforcing materials may be impregnated with a liquid, solvent-free composition and this composition rapidly converted into a solid, but still heat-curable, state without the inconveniences just mentioned of the prior art methods. In this novel method, a liquid composition, containing an epoxide resin and a photopolymerisable compound, it photopolymerised by exposure to actinic radiation, optionally in the presence of a catalyst for the photopolymerisation, but without thermally crosslinking it; exposure times as short as one second have been used successfully. The resultant prepreg is, when desired, fully cured by heating to form the composite.

DETAILED DISCLOSURE

The present invention provides, accordingly, a method for the preparation of prepregs which comprises
  i. impregnating a fibrous reinforcing material with a liquid composition containing an epoxide resin, a photopolymerisable compound (other than a phenol-aldehyde), and a heat-activated curing agent for epoxide resins, and
  ii. in the absence of a substance which gives rise to a substantial degree of photoinduced polymerisation through consumption of epoxide groups, exposing the impregnated material to actinic radiation such that the composition solidifies due to photopolymerisation of the said photopolymerisable compound while the epoxide resin remains substantially in the thermosettable state.

There are also provided prepregs prepared by the method of this invention.

Other aspects of this invention provide a method of preparing a reinforced composite which comprises heat-curing a photopolymerised, but still thermosettable, prepreg of this invention, and reinforced composites prepared by this method.

The reinforcement may be in the form of woven or non-woven sheets, unidirectional lengths, or chopped strands and may be of natural or synthetic fibres, especially glass, boron, stainless steel, tungsten, silicon carbide, asbestos, an aromatic polyamide such as poly(m-phenylene isophthalamide) or poly(p-phenylene terephthalamide), or carbon.

Compositions used to prepare the prepregs of the present invention must be liquid under the conditions used in making the prepregs but are preferably solvent-free.

Epoxide resins, i.e., substances containing more than one 1,2-epoxide group per average molecule, suitable for use in the present invention are preferably those containing groups of formula

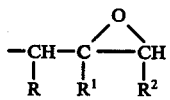

I directly attached to atoms of oxygen, nitrogen, or sulphur, where either R and $R^2$ each represent a hydrogen atom, in which case $R^1$ denotes a hydrogen atom or a methyl group, or R and $R^2$ together represent —$CH_2CH_2$—, in which case $R^1$ denotes a hydrogen atom.

As examples of such resins may be mentioned polyglycidyl and poly($\beta$-methylglycidyl) esters obtainable by reaction of a compound containing two or more carboxylic acid groups per molecule with epichlorohydrin, glycerol dichlorohydrin, or $\beta$-methylepichlorohydrin in the presence of an alkali. Such polyglycidyl esters may be derived from aliphatic polycarboxylic acids, e.g., succinic acid, glutaric acid, adipic acid, pimelic acid, suberic acid, azelaic acid, sebacic acid, or dimerised or trimerised linoleic acid; from cycloaliphatic polycarboxylic acids such as tetrahydrophthalic acid, 4-methyltetrahydrophthalic acid, hexahydrophthalic acid, and 4-methylhexahydrophthalic acid; and from aromatic polycarboxylic acids such as phthalic acid, isophthalic acid, and terephthalic acid.

Further examples are polyglycidyl and poly(β-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane-1,3-diol, butane-1,4-diol, poly(oxytetramethylene) glycols, pentane-1,5-diol, hexane-2,4,6-triol, glycerol, 1,1,1-trimethylolpropane, pentaerythritol, sorbitol, and poly(epichlorohydrin); from cycloaliphatic alcohols such as resorcitol, quinitol, bis(4-hydroxycyclohexyl)methane, 2,2-bis(4-hydroxycyclohexyl)propane, and 1,1-bis(hydroxymethyl)cyclohex-3-ene; and from alcohols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis(4-hydroxyphenyl) sulphone, 1,1,2,2-tetrakis(4-hydroxyphenyl)ethane, 2,2,-bis(4-hydroxyphenyl)propane (otherwise known as bisphenol A), 2,2-bis(3,5-dibromo-4-hydroxyphenyl)propane, and novolaks formed from aldehydes such as formaldehyde, acetaldehyde, chloral, and furfuraldehyde, with phenols such as phenol itself, and phenol substituted in the ring by chlorine atoms or by alkyl groups each containing up to nine carbon atoms, such as 4-chlorophenol, 2-methylphenol, and 4-tert.butylphenol.

Poly(N-glycidyl) compounds include, for example, those obtained by dehydrochlorination of the reaction products of epichlorohydrin with amines containing at least two amino-hydrogen atoms, such as aniline, n-butylamine, bis(4-aminophenyl)methane, and bis(4-methylaminophenyl)-methane; triglycidyl isocyanurate; and N,N'-diglycidyl derivatives of cyclic alkylene ureas, such as ethyleneurea and 1,3-propyleneureas, and of hydantoins such as 5,5-dimethylhydantoin.

Examples of poly(S-glycidyl) compounds are di-S-glycidyl derivatives of dithiols such as ethane-1,2-dithiol and bis(4-mercaptomethylphenyl) ether.

Examples of epoxide resins having groups of formula I where R and $R^2$ conjointly denote a —CH$_2$CH$_2$— group are bis(2,3-epoxycyclopentyl) ether, 2,3-epoxycyclopentyl glycidyl ether, and 1,2-bis(2,3-epoxycyclopentyloxy)ethane.

Epoxide resins having the 1,2-epoxide groups attached to different kinds of hetero atoms may be employed, e.g., the N,N,O-triglycidyl derivative of 4-aminophenol, the glycidyl ether-glycidyl ester of salicylic acid, N-glycidyl-N'-(2-glycidyloxypropyl)-5,5-dimethylhydantoin, and 2-glycidyloxy-1,3-bis(5,5-dimethyl-1-glycidylhydantoin-3-yl)propane.

Epoxide resins in which some or all of the epoxide groups are not terminal may also be employed, such as vinylcyclohexene dioxide, limonene dioxide, dicyclopentadiene dioxide, 4-oxatetracyclo[6.2.1.0$^{2,7}$.0$^{3,5}$]-undec-9-yl glycidyl ether, the bis(4-oxatetracyclo[6.2.1.0$^{2,7}$.0$^{3,5}$]undec-9-yl) ether of ethylene glycol, 3,4-epoxycyclohexylmethyl 3',4'-epoxycyclohexanecarboxylate and its 6,6'-dimethyl derivative, the bis(3,4-epoxycyclohexanecarboxylate) of ethylene glycol, 3-(3,4-epoxycyclohexyl)-8,9-epoxy-2,4-dioxaspiro[5,5]undecane, and epoxidised butadienes or copolymers of butadiene with ethylenic compounds such as styrene and vinyl acetate.

If desired, a mixture of epoxide resins may be used.

Especially preferred epoxide resins, which may have been advanced, used in the process of this invention are diglycidyl ethers of dihydric phenols such as 2,2-bis(4-hydroxyphenyl)propane and bis(4-hydroxyphenyl)methane and of dihydric alcohols such as of butane-1,4-diol, and N,N'-diglycidyl derivatives of hydantoins, such as 1,3-diglycidyl-5,5-dimethylhydantoin.

The photopolymerisable compound used in the process of the present invention may be of any chemical type known to polymerise under the influence of actinic radiation. Such materials are described in, for example, Kosar, "Light-sensitive Systems: Chemistry and Applications of Non-Silver Halide Photographic Processes," Wiley, New York, 1965.

As is well known, these materials fall into two main classes a. those which are polymerised through a free-radical chain reaction (photoinitiated polymerisation) and b. those in which polymerisation is effected by reaction of an excited monomer molecule with another monomer molecule.

The first type require only one photopolymerisable group per molecule to form long chains on polymerisation while the second type must have at least two photopolymerisable groups per molecule, since if they have only one such group per molecule they will dimerise, but not polymerise, on irradiation.

Photopolymerisable substances of the first type preferred for use in this invention have one ethylenic linkage, or more than one providing they are unconjugated. Examples of these substances are acrylic esters containing at least one group of the general formulae II, III, or IV

$$CH_2=C(R^3)COO— \hspace{4em} II$$

$$[CH_2=C(R^3)CONH]_2 CHCOO— \hspace{2em} III$$

$$CH_2=C(R^3)CONHCH(OH)CH_2COO— \hspace{1em} IV$$

where $R^3$ is a hydrogen, chlorine, or bromine atom, or an alkyl hydrocarbon group of 1 to 4 carbon atoms, especially a hydrogen atom or a methyl group. Other examples are styrene and crotonic acid.

Photopolymerisable materials of the second type include those having at least two, and preferably three or more, groups which are azido, coumarin, stilbene, maleimide, pyridinone, chalcone, propenone, pentadienone, or acrylic acid groups which are substituted in their 3- position by groups having ethylenic unsaturation or aromaticity in conjugation with the ethylenic double bond of the acrylic group.

Examples of suitable azides are those containing at least two groups of the formula

$$N_3—Ar— \hspace{4em} V$$

where Ar denotes a mononuclear or dinuclear aromatic radical containing in all from 6 to at most 14 carbon atoms, especially a phenylene or naphthylene group.

Examples of suitable coumarins are those containing groups of the formula

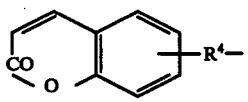  VI where
R⁴ is an oxygen atom, a carbonyloxy group (—COO—), a sulphonyl group, or a sulphonyloxy group.

Examples of those containing stilbene groups are those containing groups of the formula

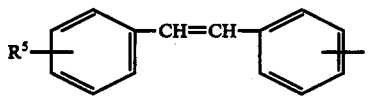  VII where
R⁵ is the residue, containing up to 8 carbon atoms in all, of a five or six-membered nitrogen-containing heterocyclic ring, fused to a benzene or naphthalene nucleus, and linked through a carbon atom of the said heterocyclic ring adjacent to a nitrogen hetero atom thereof to the indicated benzene nucleus, such as a benzimidazolyl, benzoxazolyl, benzotriazolyl, benzothiazolyl, or a naphthotriazolyl residue.

Examples of those containing maleimide units are those having groups of the formula

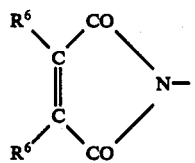  VIII where
each R⁶ is an alkyl group of 1 to 4 carbon atoms, a chlorine atom, or a phenyl group, especially a methyl group.

Examples of those containing pyridinone units are those having groups of the formula

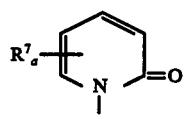  IX where
R⁷ is an aliphatic or cycloaliphatic radical of 1 to 8 carbon atoms, and
$a$ is zero or an integer of 1 to 4.

Examples of compounds containing chalcone, propenone, and pentadienone groups are those containing structures of formula

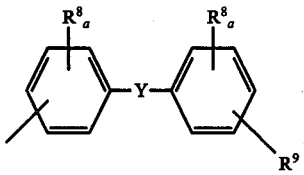  X or

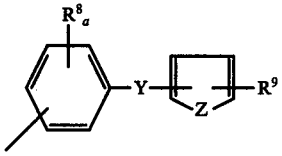  XI where
each $R^8$ is a halogen atom, or an alkyl, cycloalkyl, alkenyl, cycloalkenyl, alkoxy, cycloalkoxy, alkenoxy, cycloalkenoxy, carbalkoxy, carbocycloalkoxy, carbalkenoxy, or carbocycloalkenoxy group, such organic groups containing 1 to 9 carbon atoms, or is a nitro group, or a carboxyl, sulphonic, or phosphoric acid group in the form of a salt,
$a$ has the meaning previously assigned,
$R^9$ represents a valency bond or a hydrogen atom,
Y represents a chain of carbon atoms containing in that chain a grouping of formula

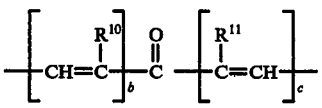  XII

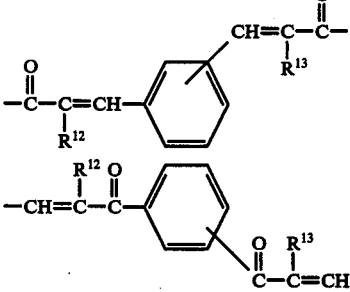  XIII

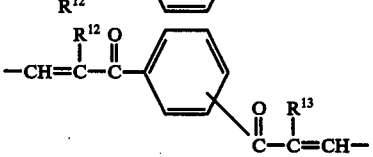  XIV $R^{10}$ and $R^{11}$ are each individually a hydrogen atom, an alkyl group, e.g., of 1 to 4 carbon atoms, or an aryl group, preferably a mononuclear group such as a phenyl group, or $R^{10}$ and $R^{11}$ conjointly denote a polymethylene chain of 2 to 4 methylene groups,
$R^{12}$ and $R^{13}$ are each a hydrogen atom, an alkyl group, e.g., of 1 to 4 carbon atoms, or an aryl group, preferably a mononuclear group such as a phenyl group,
$b$ and $c$ are each zero, 1, or 2, with the proviso that they are not both zero, and
Z is an oxygen or sulphur atom.

Suitable 3- substituted acrylates contain groups of the general formula $$R^{14}CH = C(R^3)COO—$$  XV where R[14] is an aliphatic or mononuclear aromatic, araliphatic, or heterocyclyl group which, as already indicated, has ethylenic unsaturation or aromaticity in conjugation with the ethylenic double bond shown, such as a phenyl, 2-furyl, 2- or 3-pyridyl, prop-2-enyl, or styryl group, and R[3] has the meaning previously assigned.

Specific examples are disorbates of poly(oxyethylene) glycols and poly(oxypropylene) glycols.

If desired, a mixture of photopolymerisable compounds may be used. Especially preferred photopolymerisable compounds used in the process of this invention are esters of acrylic acid which are of any of the following general formulae XVI to XX.

Formula XVI is

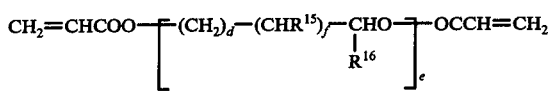

where
$d$ is an integer of 1 to 8,
$e$ is an integer of 1 to 20,
$f$ is zero or 1,
$R^{15}$ denotes —H, —OH, or —OOCCH=CH$_2$, and
$R^{16}$ denotes —H, —CH$_3$, —C$_2$H$_5$, —CH$_2$OH, or —CH$_2$OOCCH=CH$_2$.

Examples of compounds of formula XVI are triethylene glycol diacrylate and tetraethylene glycol diacrylate.

Formula XVII is

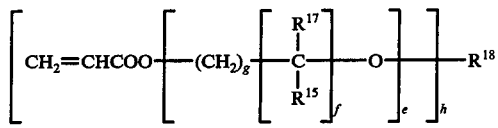

where
$e, f,$ and $R^{15}$ have the meanings assigned above,
$g$ is zero or a positive integer, provided that $f$ and $g$ are not both zero,
$h$ is 1, 2, 3, or 4,
$R^{17}$ denotes —H, —Cl, —CH$_3$, or —C$_2$H$_5$, and
$R^{18}$ denotes an organic radical of valency $h$ linked through a carbon atom or carbon atoms thereof to the indicated $h$ terminal oxygen atoms, preferably the hydrocarbon residue of an aliphatic alcohol containing from 1 to 6 carbon atoms, such as —CH$_3$ or

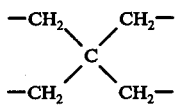

Formula XVIII is

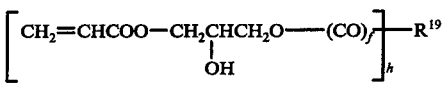

where
$f$ and $h$ have the meanings previously assigned, and $R^{19}$ denotes an organic radical of valency $h$, linked through a carbon atom thereof other than the carbon atom of a carbonyl group.

More particularly, when $f$ is zero, $R^{19}$ may denote the residue, containing from 1 to 18 carbon atoms, of an alcohol or phenol having $h$ hydroxyl groups.

$R^{19}$ may thus represent, for example an aromatic group (which may be substituted in the ring by alkyl groups), an araliphatic, cycloaliphatic, heterocyclic, or heterocycloaliphatic group, such as an aromatic group containing only one benzene ring, optionally substituted by chlorine or by alkyl groups each of from 1 to 9 carbon atoms, or an aromatic group comprising a chain of two benzene rings, optionally interrupted by ether oxygen atoms, aliphatic hydrocarbon groups of 1 to 4 carbon atoms, or sulphone groups, each benzene ring being optionally substituted by chlorine or by alkyl groups each of from 1 to 6 carbon atoms, or, preferably, a saturated or unsaturated, straight or branchedchain aliphatic group, which may contain ether oxygen linkages and which may be substituted by hydroxyl groups, especially a saturated or monoethylenically-unsaturated straight chain aliphatic hydrocarbon group of from 1 to 8 carbon atoms.

Specific examples of such groups are the aromatic groups of the formulae —C$_6$H$_5$ and —C$_6$H$_4$CH$_3$, in which case $h$ is 1, —C$_6$H$_4$C(CH$_3$)$_2$ C$_6$H$_4$—, and —C$_6$H$_4$CH$_2$C$_6$H$_4$—, in which case $h$ is 2, and —C$_6$H$_4$(CH$_2$C$_6$H$_3$)$_j$CH$_2$C$_6$H$_4$—where $j$ is 1 or 2, in which case $h$ is 3 or 4, and the aliphatic groups of formula

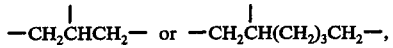

in which case $h$ is 3, of formula —(CH$_2$)$_4$—, —CH$_2$CH=CHCH$_2$—, —CH$_2$CH$_2$OCH$_2$CH$_2$—, or —(CH$_2$CH$_2$O)$_2$CH$_2$CH$_2$—, in which case, $h$ is 2, or of the formula —(CH$_2$)$_3$CH$_3$, —(CH$_2$)$_3$CH$_3$, —(CH$_2$)$_4$OH, —CH$_2$CH=CH$_2$, —(CH$_2$)$_2$OH, —CH$_2$CH(CH$_3$)OH, or —CH$_2$CH=CHCH$_2$OH, in which case $h$ is 1.

When $b$ is 1, $R^{19}$ may represent the residue, containing from 1 to 60 carbon atoms, of an acid having $h$ caboxyl groups, preferably a saturated or ethylenically-unsaturated, straight chain or branched aliphatic hydrocarbon group of from 1 to 20 carbon atoms, which may be substituted by chlorine atoms and which may be interrupted by ether oxygen atoms and/or by carbonyloxy groups, or a saturated or ethylenically-unsaturated cycloaliphatic or aliphatic-cycloaliphatic hydrocarbon group of at least 4 carbon atoms, which may be substituted by chlorine atoms, or an aormatic hydrocarbon group of from 6 to 12 carbon atoms, which may be substituted by chlorine atoms.

Further preferred are such compounds in which $R^{19}$ represents a saturated or ethylenically-unsaturated straight chain or branched aliphatic hydrocarbon group of from 1 to 8 carbon atoms, optionally substituted by a hydroxyl group, or a saturated or ethylenically-unsaturated straight chain or branched aliphatic hydrocarbon group of from 4 to 50 carbon atoms and interrupted in the chain by carbonyloxy groups, or a saturated or ethylenically-unsaturated monocyclic or dicyclic cycloaliphatic hydrocarbon group of 6 to 8 carbon atoms, or an ethylenically-unsaturated cycloaliphatic-aliphatic hydrocarbon group of from 10 to 51 carbon atoms, or a mononuclear aromatic hydrocarbon group of from 6 to 8 carbon atoms.

Specific examples of these residues of carboxylic acids are those of the formula $-CH_3$, $-CH_2CH_3$, $-CH_2CH(OH)CH_3$, $-CH_2Cl$, and $-C_6H_5$, in which case $h$ is 1, and $-CH_2CH_2-$, $-CH=CH-$, and $-C_6H_4-$, in which case $h$ is 2.

Specific examples of suitable compounds of formula XVIII are 1,4-bis(2-hydroxy-3-(acryloxy)propoxy)butane, a poly(2-hydroxy-3-(acryloxy)propyl) ether of a phenol-formaldehyde novolak, 1-(2-hydroxy-3-acryloxypropoxy)-butane, -n-octane, and -n-decane, bis(2-hydroxy-3-acryloxypropyl) adipate, 2-hydroxy-3-acryloxypropyl propionate and 3-phenoxy-2-hydroxypropyl acrylate.

Formula XIX is

where
$R^{20}$ denotes $CH_3-$, $C_2H_5-$, or $-CH_2OOCCH=CH_2$.

Examples of such acrylates atre pentaerythritol tetraacrylate and 1,1,1-trimethylolpropane triacrylate.

Formula XX is

where
$R^{21}$ denotes either an alkyl group of 1 to 6 carbon atoms, optionally substituted by one hydroxyl group, or a dialkylaminoalkyl group containing in all 3 to 12 carbon atoms, such as ethyl, n-propyl, n-butyl, 2-hydroxyethyl, 2-hydroxypropyl, and diethylaminoethyl groups.

The molar ratio of epoxide resin to photopolymerisable compound is such that there is sufficient of each present to form both a satisfactory prepreg and a satisfactorily cured composite. Usually the molar ratio is from 10:1 to 1:10, and especially from 5:1 to 1:5.

Liquid resin compositions used in the process of this invention may also contain a substance having in the same molecule at least one 1,2-epoxide group and at least one dissimilar (i.e., not 1,2-epoxide) group through which the substance can be polymerised by means of actinic radiation (called hereinafter a "dual-functional substance").

Suitable dual-functional substances may be made by introducing photopolymerisable groups (i.e., groups through which polymerisation can be induced by means of actinic radiation) into a compound which already contains one or more 1,2-epoxide groups or, conversely, by introducing one or more 1,2-epoxide groups into a compound which already contains one or more photopolymerisable groups.

A convenient method of introducing photopolymerisable groups into a compound which already contains epoxide groups comprises reaction of an at least diepoxide with a stoichiometric deficit, based on the epoxide group content, of a compound containing both a photopolymerisable group and also a group, such as a carboxylic acid, phenolic or alcoholic hydroxyl, or imido group, capable of reaction with a 1,2-epoxide group so as to introduce at least one photopolymerisable group into the molecule.

It will be understood that this method does not usually give rise to more than a 50% yield of dual-functional material. Thus, taking acrylic acid as an example of a compound containing both a group through which it can be polymerized (the ethylenic unsaturation) and a group capable of reaction with a 1,2-epoxide group (the carboxylic acid group), reaction of a diepoxide with 0.5 mol of acrylic acid per epoxide group affords a product which, on a statistical basis, can be considered to comprise 50 mol-% of the epoxide-acrylate, 25 mol-% of the diacrylate, and 25 mol-% of unchanged diepoxide. Clearly, with lesser or greater amounts of acrylic acid, there would be obtained lesser or greater amounts of the diacrylate and the diepoxide but a lesser amount of the epoxide acrylate. The dual-functional material, is, or course, accompanied by both photopolymerisable material (the diacrylate in this case) and a thermosetting material (the diepoxide).

Usually, from 10 to 50 mol-% of the dual-functional material is employed, calculated on the combined mols. of epoxide resin and the said photopolymerisable compound.

Examples of classes of compounds containing a photopolymerisable group and also a carboxylic acid group are acrylic, and acrylamido-substituted carboxylic, acids; azidoaromatic acids; carboxyl-substituted stilbene derivatives such as stilbenebenzimidazoles, stilbenebenzoxazoles, stilbenebenzotriazoles, stilbenenaphthotriazoles, and stilbenebenzothiazoles; carboxyl-containing maleimides, where the two ethylenic carbon atoms of the maleimide ring are substituted by alkyl groups of 1 to 4 carbon atoms, phenyl groups, or chlorine atoms; and also acrylic acids substituted in the 3-position by groups having ethylenic unsaturation or aromaticity in conjugation with the ethylenic bond in the 2,3-position. Examples of classes of compound containing a photopolymerisable group and also a phenolic hydroxyl group are hydroxy-substituted chalcones and hydroxyphenyl-substituted propenones and pentadienones. Examples of classes of compounds containing a photopolymerisable group and also an alcoholic hydroxyl group are hydroxy-substituted maleimides and hydroxy-substituted pyridinones. Examples of classes of compounds containing a photopolymerisable group and an imido group are disubstituted maleimides, where the two ethylenic carbon atoms of the maleimide ring are substituted as specified above.

Suitable acrylic, and acrylamido-substituted carboxylic, acids are of the general formula

          XXI or

          XXII or

          XXIII where
$R^3$ has the meaning previously assigned.

Suitable azidoaromatic acids are 4-azidobenzoic acid and other compounds of formula

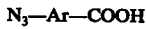          XXIV where Ar has the meaning previously assigned.

Suitable carboxyl-containing stilbene derivatives are 4-(1-methylbenzimidazol-2-yl)stilbene-4'-carboxylic acid, 4-(2H-naphtho[1,2-d]triazol-2-yl)stilbene-4'-carboxylic acid, and other compounds of the general formula

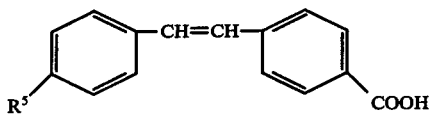   XXV where
R⁵ has the meaning previously assigned.

Suitable carboxyl-containing maleimides are N-(carboxyphenyl)-dimethylamaleimide and other compounds of the general formula

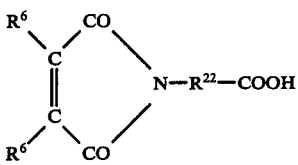   XXVI where
each $R^6$ has the meaning previously assigned, and
$R^{22}$ denotes the residue, containing up to 8 carbon atoms, of an aromatic, aliphatic, or cycloaliphatic aminocarboxylic acid after removal of a primary amino group and a carboxylic acid group.

Suitable hydroxy-substituted chalcones and hydroxyphenyl-substituted propenones and pentadienones are 1-(4-hydroxyphenyl)-3-oxo-3-phenylprop-1-ene, 1-(4-hydroxyphenyl)-1-oxo-3-phenylprop-2-ene, 1-(2-furyl)-3-oxo-3-(4-hydroxyphenyl)prop-1-ene, and other compounds of the general formula

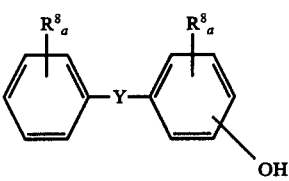   XXVII or

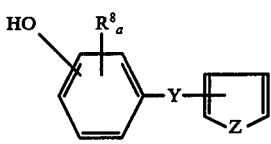   XXVIII where
each $R^8$, $a$, and Y have the meaning previously assigned.

Suitable hydroxy-substituted maleimides and hydroxy-substituted pyridinones are N-(2-hydroxyethyl)-dimethylmaleimide and 4,6-dimethyl-1-(2-hydroxyethyl)pyridin-2-one, and other compounds of the general formula

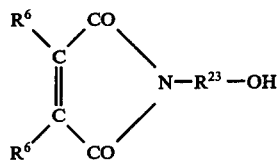   XXIX or

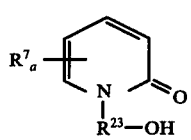   XXX where
each $R^6$, and $R^7$ and $a$ have a meaning previously assigned and,
$R^{23}$ denotes the residue, of not more than 8 carbon atoms, of an aliphatic or cycloaliphatic aminoalcohol after removal of an amino group and an alcoholic hydroxyl group.

Suitable imides are dimethylmaleimide and other compounds of the general formula

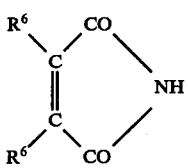   XXXI where
each $R^6$ has the meaning previously assigned. Suitable 3-substituted acrylic acids are of formula

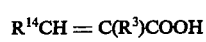

$R^{14}CH = C(R^3)COOH$   XXXII where
$R^3$ and $R^{14}$ have the meaning previously assigned.

Polyepoxides which may be employed to react with the phenolic or alcoholic hydroxyl, or carboxylic acid, or imido groups are preferably those containing groups of formula I.

As examples of such polyepoxides may be mentioned the epoxide resins listed above as suitable components in the resin compositions used in the process of this invention.

Reaction may be effected in the absence or presence of a solvent and at ambient or elevated temperature, preferably at 50° to 150° C. A catalyst such as a quaternary ammonium compound, a tertiary amine, a thioether or a sulphonium salt is usually added, as is a free radical inhibitor such as hydroquinone.

Typical such dual-functional substances are described in U. S. Pat. No. 3,450,613 and in West German Offenlegungsschrift No. 2,342,407.

The preferred dual-functional substances hence contain in the same molecule at least one group of formula I directly attached to an oxygen, nitrogen, or sulphur atom, and at least one group of formula $$\text{L—CH} \overset{R}{\underset{|}{-}} \overset{R^1}{\underset{|}{C}} \overset{R^2}{\underset{|}{-}} \text{CH—}$$
$$\quad\quad\quad \underset{OH}{|}$$

XXXIII directly attached to an oxygen, nitrogen, or sulphur atom, where

R, $R^1$, and $R^2$ are as hereinbefore defined, and

L is the monovalent residue of a photopolymerisable substance after removal of a hydrogen atom attached directly to an oxygen, nitrogen, or sulphur atom, such as a group of any of formulae II to XI and XV.

Preferred groups L include any of formulae II to IV and VI, and the following formulae $$N_3\text{—Ar—COO—}$$

XXXIV

[structure with CH=CH linking two phenyl rings, $R^5$ and COO—]

XXXV

[structure with $R^6$, CO, C=C, CO, $N-R^{22}-COO-$]

XXXVI

[structure with two phenyl rings substituted with $R^8_a$, linked by Y, terminating in O—]

XXXVII

[structure with heterocycle (Z), Y, phenyl ring with $R^8_a$, terminating in O—]

XXXVIII

[structure with $R^6$, CO, C=C, CO, $N-R^{23}-O-$]

XXXIX

[structure with $R^7_a$, N, C=O, $R^{23}-O-$]

XL

[structure with $R^6$, CO, C=C, CO, N—]

XLI and $$R^{14}CH = C(R^3)COO—$$

XLII where Ar, $R^5$-$R^8$, $R^{14}$, $R^{22}$, $R^{23}$, a, b, Y, and Z have the meanings previously assigned.

Another method of making dual-functional compounds, by introducing an epoxide group or groups into a compound having at least one photopolymerisable group, comprises utilising one which has also at least one alcoholic or phenolic hydroxyl, or a carboxyl, group and treating it such that the group or groups is or are converted into 1,2-epoxide groups, using methods known in the art of epoxide resins for converting hydroxyl or carboxyl groups into glycidyl ether or ester groups. For example, the compound is caused to react with epichlorohydrin in the presence of a hydrogen chloride acceptor (usually a strong base, e.g., NaOH) and preferably of a catalyst such as a quaternary ammonium compound, a tertiary amine, a thioether, or a sulphonium salt. Usually an excess of epichlorohydrin over the theoretical quantity required is employed, the excess serving as solvent for the reaction, which is normally carried out at a temperature of 30° to 120° C, preferably 40° to 65° C, and usually under reduced pressure in order to remove the water formed during the reaction.

Examples of dual-functional substances so obtainable are glycidyl esters of formula $$CH_2=C(R^3)COOCH_2CH\overset{O}{\overset{\diagup\diagdown}{\text{———}}}CH_2$$

XLIII and $$R^{14}CH=C(R^3)COOCH_2CH\overset{O}{\overset{\diagup\diagdown}{\text{———}}}CH_2$$

XLIV where $R^3$ and $R^{14}$ each have the meanings previously assigned, such as glycidyl acrylate, methacrylate, cinnamate, 3-(2-furyl)-acrylate, and sorbate.

Examples of other dual-functional substances similarly obtainable are glycidyl esters of azidoaromatic acids, of formula $$N_3ArCOOCH_2CH\overset{O}{\overset{\diagup\diagdown}{\text{———}}}CH_2$$

XLV where

Ar has the meaning previously assigned, and glycidyl ethers of monohydroxyphenyl chalcones and chalconelike substances, having the general formula

[structure with two phenyl rings substituted with $R^8_a$ and $R^8_b$, linked by Y, with $OCH_2CH\overset{O}{\overset{\diagup\diagdown}{\text{—}}}CH_2$]

XLVI or

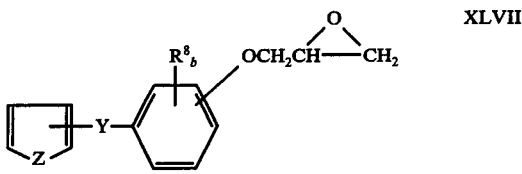

where
R[8], Y, Z, a, and b have the meanings previously assigned.

Preferably the photopolymerisable compound is irradiated in the presence of a photopolymerisation catalyst. Suitable catalysts are well known and are described in, for example, the book by Kosar cited above.

Like the photopolymerisable compounds, the catalysts fall into two main classes (a) those which, on irradiation, give an excited state that leads to formation of free radicals which then initiate polymerisation of the monomer (photoinitiators) and (b) those which, on irradiation, give an excited state which in turn transfers its excitation energy to a monomer molecule, giving rise to an excited monomer molecule which then crosslinks with an unexcited monomer molecule (photosensitisers).

The first class includes organic peroxides and hydroperoxides, α-halogen substituted acetophenones such as 2,2,2-trichloro-4'-tert.butylacetophenone, benzoin and its alkyl ethers, e.g., the n-butyl ether, benzophenones, O-alkoxycarbonyl derivatives of an oxime of benzil or 1-phenylpropane-1, 2-dione, such as benzil (O-ethoxycarbonyl)-α-monoxime and 1-phenylpropane-1, 2-dione-2-(O-ethoxycarbonyl)oxime, benzil acetals, e.g., its dimethyl acetal, and mixtures of phenothiazine dyes (e.g., methylene blue) or quinoxalines (e.g., metal salts of 2-(m- or p-methoxyphenyl)quinoxaline-6'- or 7'-sulphonic acids) with electron donors such as sodium benzenesulphinate or other sulphinic acid or a salt thereof, an arsine, a phosphine, or thiourea (photoredox systems), these initiators being used with unsaturated esters, especially acrylates and methacrylates, and also acrylamides.

The second class includes 5-nitroacenaphthene, 4-nitroaniline, 2,4,7-trinitro-9-fluorenone, 3-methyl-1,3-diaza-1,9-benzanthrone, and bis(dialkylamino)benzophenones, especially Michler's ketone, i.e., bis(p-dimethylamino)benzophenone.

Suitable photopolymerisation catalysts are readily found by routine experimentation. The catalyst must not, of course, give rise to a substantial degree of photoinduced polymerisation through consumption of epoxide groups nor should any other substance present: further, the photopolymerisation catalyst must not cause curing of the epoxide resin such that the epoxide resin does not remain substantially thermosettable.

Generally, 0.1 to 20%, and preferably 0.5 to 15%, by weight of the photopolymerisation catalyst is incorporated, based on the combined weight of the photopolymerisable compound and, if used, the dual-functional substance.

In the photopolymerising step actinic radiation of wavelength 200-600 nm is preferably used. Suitable sources of actinic radiation include carbon arcs, mercury vapour arcs, fluorescent lamps with phosphors emitting ultraviolet light, argon and xenon glow lamps, tungsten lamps, and photographic flood lamps. Of these, mercury vapour arcs, particularly sun lamps, fluorescent sun lamps, and metal halide lamps are most suitable. The time required for the exposure of the photopolymerisable compound will depend upon a variety of factors which include, for example, the individual compound used, the amount of that compound on the reinforcement, the type of light source, and its distance from the impregnated material. Suitable times may be readily determined by those familiar with photopolymerisation techniques, but in all cases the product after photopolymerisation must still be curable by heating: for this reason, photopolymerisation is carried out at temperatures below those where curing of the epoxide resin by the heat-activated curing agent becomes substantial.

Suitable heat-activated curing agents include polycarboxylic acid anhydrides, dicyandiamide, complexes of amines, such as solely tertiary amines, with boron trifluoride or boron trichloride, latent boron difluoride chelates, aromatic polyamines, and imidazoles such as 2-ethyl-4-methylimidazole. When the epoxide resin is an N-glycidyl compound, the curing agent is preferably not a boron halide complex. The heat-curing agent is usually dissolved or suspended in the liquid composition before impregnation of the reinforcement.

The temperatures and duration of heating required for the thermal curing and the proportions of curing agent are readily found by routine experimentation and easily derivable from what is already well known concerning the heat-curing of epoxide resins.

The photopolymerisable compound, epoxide resin, the thermally-activated curing agent, and, if used, the catalyst for the photopolymerisation and the dual-functional substance, are preferably applied so that the pre-preg contains a total of from 20 to 80% by weight of the said components, and, correspondingly, 80 to 20% by weight of the reinforcement. More preferably, a total of 30 to 50% by weight of these components and 70 to 50% by weight of the reinforcement are employed.

Products made in accordance with the present invention may be in the form of flat sheets or shaped articles. When a hollow shaped article is required it is particularly convenient to impregnate a continuous tow of fibrous reinforcing material and wind the tow around a former while, at the same time, exposing the winding to actinic radiation. Such windings still have a certain degree of flexibility, permitting the former to be removed more easily than when a rigid winding is formed in one step. When desired, the filament winding is heated to complete the cure.

The following Examples illustrate the invention. Temperatures are in degrees Celsius and, unless otherwise indicated, parts are by weight. Epoxide contents were determined by titration against a 0.1N solution of perchloric acid in glacial acetic acid in the presence of excess of tetraethylammonium bromide, crystal violet being used as the indicator. All interlaminar shear strengths quoted are the mean of three results and were determined by ASTM method D 2344-72; flexural strengths are also the mean of three results and were determined according to BS 2782, Method 304B.

EXAMPLE 1

1,4-bis(3-Acryloxy-2-hydroxypropoxy)butane, used as the photopolymerisable component, was prepared in the following manner.

To a mixture of 168.3 g of acrylic acid (1 equiv. per epoxide equiv.), 1.5 g of tetramethylammonium chloride, and 0.75 g of hydroquinone, stirred at 120°, was added 250 g of 1,4-diglycidyloxybutane (having an epoxide content of 9.35 equiv./kg) over 1½ hours. The mixture was stirred at 120° for a further 1½ hours, by which time the reaction was substantially complete, the epoxide content being negligible.

A 30 g sample of this diacrylate was mixed with 70 g of 2,2-bis(4-glycidyloxyphenyl)propane )epoxide content 5.2 equiv./kg) as the heat-curable resin; 2 g of benzil dimethyl acetal was then dissolved in the mixture, and 4 g of dicyandiamide was milled in using a triple roll mill.

This liquid composition was used to make a prepreg in the following manner.

Glass cloth (square weave) was impregnated with the composition and then exposed on both sides to a 500 watt medium pressure mercury vapour lamp at a distance of 15 cm for 60 seconds, the composition becoming solid as photopolymerisation proceeded.

A 12-ply glass cloth laminate, which comprised 37.5% of resin and 62.5% of glass, was made by heating twelve 15 cm-square pieces of this prepreg at 170° for 1 hour at a pressure of 2.1 MN/m$^2$. The laminate produced had an interlaminar shear strength of 24.2 MN/m$^2$. After the laminate had been immersed in boiling water for 2 hours, its interlaminar shear strength was still 20.5 MN/m$^2$.

EXAMPLE 2

Benzil dimethyl acetal (2%) and dicyandiamide (4%) were added to a 1:1 mixture of neopentyl glycol diacrylate and 2,2-bis(glycidyloxyphenyl)propane (epoxide content 5.2 equiv./kg). This liquid composition was used to make a prepreg as described in Example 1, except that the impregnated glass cloth was irradiated for 5 seconds.

A 6-ply laminate was prepared as described in Example 1; it consisted of 30.5% resin and 69.5% glass and had an interlaminar shear strength of 20.8 MN/m$^2$.

EXAMPLE 3

In this Example, and Examples 4 to 16, a mixture of diacrylates or disorbates prepared in situ is used as the photopolymerisable component and a mixture of epoxide resins is used as the heat-curable resin, in conjunction with a minor amount of epoxide-acrylates or epoxidesorbates, i.e., dual-functional substances.

To a mixture of 160 g of 2,2-bis(4-glycidyloxyphenyl)propane (epoxide content 5.3 equiv./kg), 40 g of 1,4-bis(glycidyloxy)butane (epoxide content 9.35 equiv./kg), 0.6 g of tetramethylammonium chloride, and 0.4 g of hydroquinone, stirred at 120°, was added 26.4 g (0.3 equiv. per epoxide equiv.) of acrylic acid over 15 minutes. The mixture was stirred for a further 45 minutes at 120°, by which time the epoxide content was 3.5 equiv./kg.

The product consists of two diacrylates, viz., 2,2-bis(4-(3-acryloxy-2-hydroxypropoxy)phenyl)propane and 1,4-bis(3-acryloxy-2-hydroxypropoxy)butane, the two unchanged diepoxides, and also a total of 42 mol.-% of two epoxide-acrylates, viz., 2-(4-glycidyloxy)-phenyl)-2-(4-(3-acryloxy-2-hydroxypropoxy)phenyl)-propane and 1-glycidyloxy-4-(3-acryloxy-2-hydroxypropoxy)butane.

Benzil dimethylacetal (2%) and dicyandiamide (4%) were added and the liquid composition was used to make an epoxy prepreg as described in Example 1 except that the impregnated glass cloth was irradiated for 1 second.

A 6-ply glass laminate, prepared as described in Example 1, consisted of 46.2% of resin and 53.8% of glass, and its interlaminar shear strength was 27.1 MN/m$^2$.

EXAMPLE 4

The procedure of Example 3 was repeated employing 400 g of 2,2-bis(4-glycidyloxyphenyl)propane, 100 g of 1,4-diglycidyloxybutane, 1.5 g of tetramethylammonium chloride, 1 g of hydroquinone, and 88 g of acrylic acid (0.4 equiv. per epoxide equiv.). The product had an epoxide content of 3.01 equiv./kg and contained a total of 48 mol.-% of the two epoxyacrylates.

Benzil dimethylacetal (2%) and dicyandiamide (4%) were added and the liquid composition was used to make two sets of prepregs as described in Example 1, in one case irradiating for 5 seconds and in the other for only 1 second.

Glass cloth laminates were prepared as described in Example 1. The laminate, which consisted of 64.2% of resin and 35.8% of glass, prepared from prepregs which had been irradiated for 5 seconds, had an interlaminar shear strength of 30.0 MN/m$^2$, while that prepared from prepregs irradiated for only one second, and consisting of 57.3% resin and 42.7% of glass, still has a high interlaminar shear strength, viz., 20.8 MN/m$^2$.

EXAMPLE 5

The procedure of Example 4 was repeated, with a one second irradiation, except that the prepreg was cured by heating for half an hour at 150° and then 1 hour at 170°. The composite, which consisted of 60.9% of resin and 39.1% of glass, had an interlaminar shear strength of 27.7 MN/m$^2$.

EXAMPLE 6

The procedure of Example 4 was again repeated, with irradiation for one second, but using a 400 w metal halide quartz lamp emitting predominantly in the 365 nm band. The composite comprised 60% of resin and 40% of glass, and its interlaminar shear strength was 28.4 MN/m$^2$.

EXAMPLE 7

Hexahydrophthalic anhydride (22.7 g), 2,4,6-tris(-dimethylaminomethyl)phenol (1.5 g), and benzil dimethyl acetal (1.5 g) were added to 50 g of the mixture of two diepoxides, two diacrylates, and two epoxyacrylates described in Example 4. This liquid composition was used to make a prepreg as described in Example 1, except that the impregnated glass cloth was irradiated for 30 seconds. A 6-ply glass cloth laminate was prepared as described in Example 1.

EXAMPLE 8

The procedure of Example 3 was repeated except that there was added 30.2 g of acrylic acid (0.34 equiv. per epoxide equiv.). The product (epoxide content 3.24 equiv./kg) contained a total of 44 mol.-% of the two epoxide-acrylates.

A prepreg and a six-ply laminate were made as described in Example 1 except that the impregnated glass cloth was irradiated for 3 seconds. The laminate, which consisted of 68% resin and 32% glass, had an interlaminar shear strength of 23.4 MN/m$^2$.

Another six-ply laminate was prepared under the same conditions but from a different batch of prepreg.

The latter, which consisted of 54% resin and 46% glass, has a flexural strength of 380 MN/m².

EXAMPLE 9

The procedure of Example 3 was followed, on double the scale, except that there was used 41.4 g of acrylic acid (0.25 equiv. per epoxide equiv.). The product (epoxide content, 3.7 equiv./kg), consisted of a total of 37.5 mol.-% of the two epoxide-acrylates.

A prepreg was made as described in Example 1 except that the impregnated glass cloth which irradiated for 60 seconds.

A 6-ply cloth laminate was prepared as in Example 1 but at a pressure of 1.4 MN/m². This laminate, which consisted of 65% of resin and 35% of glass, had an interlaminar shear strength of 23.5 MN/m²: after the laminate had been immersed in boiling water for 2 hours, its interlaminar shear strength was still 23.4 MN/m².

EXAMPLE 10

The procedure of Example 3 was followed, employing, however, 20.7 of acrylic acid (0.5 equiv. per epoxide equiv.). The epoxide content fell to 2.67 equiv./kg.

The product comprises the two initial diepoxides, two diacrylates, and the two dual-functional substances in a molar ratio of 1:1:2 respectively.

Benzil dimethyl acetal (2%) and bis(4-aminophenyl)methane (15%) were dissolved in this product, and the composition was used to make a prepreg as described in Example 1, but irradiating for only 60 seconds.

EXAMPLE 11

The procedure of Example 3 was repeated, using 64.4 g of sorbic acid (0.5 equiv. per epoxide equiv.) in place of acrylic acid and only 0.1 g of hydroquinone.

The product (epoxide content 2.2 equiv./kg) consisted essentially of the two initial diepoxides, two disorbates, viz., 2,2-bis(4-(3-sorbyloxy-2-hydroxypropoxy)-phenyl)propane and 1,4-bis(4-sorbyloxy-2-hydroxypropoxy)butane, and two dual-functional substances, viz., 2-(4-(glycidyloxy)phenyl)-2-(4-(3-sorbyloxy-2-hydroxypropoxy)phenyl)-propane and 1-glycidyloxy-4-(4-(3-sorbyloxy-2-hydroxypropoxy)phenyl)-butane. The molar ratio of the two diepoxides, the two disorbates, and the two dual-functional substances was 1:1:2, respectively. Michler's ketone (2%) and dicyandiamide (4%) were incorporated and the liquid composition was used to make a prepreg as described in Example 1, except that the impregnated glass cloth was irradiated for 15 minutes. Another prepreg was made similarly, using benzil dimethyl acetal (2%) in the place of the Michler's ketone.

EXAMPLE 12

To a mixture of 50 g of a commercially-available sample of 1,3-diglycidyl-5,5-dimethylhydantoin (epoxide content 7.1 equiv./kg), 0.1 g of tetramethylammonium chloride, and 0.1 g of hydroquinone, stirred at 120°, was added 12.75 g of acrylic acid (0.5 equiv. per epoxide equiv.) over 30 minutes. The mixture was stirred for a further 30 minutes at 120°, by which time the epoxide content had fallen to 2.96 equiv./kg.

The product consisted essentially of a mixture of the unchanged epoxide starting material, 1,3-bis(3-acryloxy-2-hydroxypropyl)-5,5-dimethylhydantoin, and two dual-functional compounds, viz., 1-glycidyl-3-(3-acryloxy-2-hydroxypropyl)-5,5-dimethylhydantoin, and 1-(3-acryloxy-2-hydroxypropyl)-3-glycidyl-5,5-dimethylhydantoin.

A prepreg and then a 6-ply glass cloth laminate were made, employing the procedure described in Example 1 but irradiating for only 10 seconds. The laminate, which comprised 55% of resin and 45% of glass, had an interlaminar shear strength of 23.3 MN/m².

EXAMPLE 13

To a mixture of 80 g of the 1,3-diglycidyl-5,5-dimethylhydantoin employed in Example 12, 20 g of 1,4-bis(-glycidyloxy)butane, 0.3 g of tetramethylammonium chloride, and 0.1 g of hydroquinone, stirred at 120°, was added 27.3 g of acrylic acid (0.5 equivalent per epoxide equivalent) over 15 minutes. The mixture was stirred for a further 45 minutes at 120°, by which time its epoxide content had fallen to 3.09 equiv./kg.

The product consisted of the substances similarly obtained in Example 12, and also 1,4-diglycidyloxybutane, 1,4-bis(3-acryloxy-2-hydroxypropoxy)butane, and 1-glycidyloxy-4-(3-acryloxy-2-hydroxypropoxy)butane.

Benzil dimethyl acetal (2%) and dicyandiamide (4%) were added and the liquid composition was used to make a prepreg as described in Example 1, except that the impregnated glass cloth was irradiated for only 60 seconds.

A 6-ply glass cloth laminate, made as described in Example 1, consisted of 43% of resin and 57% of glass and had an interlaminar shear strength of 11.6 MN/m².

EXAMPLE 14

To a mixture of 50 g of bis(4-glycidyloxyphenyl)methane (epoxide content 6.04 equiv./kg), 50 g of 1,4-bis(-glycidyloxy)butane (epoxide content 7.56 eqiv./kg), 0.3 g of tetramethylammonium chloride, and 0.2 g of hydroquinone, stirred at 120°, was added 24.5 g of acrylic acid (0.5 equiv. per epoxide equiv.) over 15 minutes. The mixture was stirred at 120° for a further 45 minutes, by which time the epoxide content was 2.55 equiv./kg.

The product comprises the two initial diepoxides, two diacrylates, viz., bis(4-(3-acryloxy-2-hydroxypropoxy)phenyl)methane and 1,4-bis(3-acryloxy-2-hydroxypropoxy)butane, and two dual-functional materials, viz., 4-(glycidyloxy)phenyl-4-(3-acryloxy-2-hydroxypropoxy)-phenylmethane and 1-glycidyloxy-4-(3-acryloxy-2-hydroxypropoxy)butane, in a molecular ratio of 1:1:2 respectively.

A prepreg and a six-ply laminate were made as described in Example 1 except that the impregnated glass cloth was irradiated for only 60 seconds. The laminate, which comprised 44% of resin and 56% of glass, had an interlaminar shear strength of 17.5 MN/m².

EXAMPLE 15

The procedure of Example 14 was repeated, using only 10 g of 1,4-diglycidyloxybutane and, correspondingly, 13.6 g of acrylic acid instead of 24.5 g. The epoxide content of the product was 2.2 equiv./kg. A prepreg, and then a 6-ply glass cloth laminate, was prepared as described in Example 14. This laminate, which consisted of 68.5% of glass, had an interlaminar shear strength of 34.4 MN/m². After the laminate had beem immersed in boiling water for 2 hours, its interlaminar shear strength was still 25.1 MN/m².

EXAMPLE 16

Acrylic acid (14.3 g, 0.35 equiv. per epoxide equiv.) was added over 15 minutes to a stirred mixture, at 120°, of 80 g of 2,2-bis(4-glycidyloxyphenyl)propane (epoxide content 5.3 equiv./kg) and 20 g of 3,4-epoxycyclohexylmethyl 3,4-epoxycyclohexanecarboxylate (epoxide content 7.3 equiv./kg) in the presence of 0.3 g of tetramethylammonium chloride and 0.2 g of hydroquinone. The mixture was stirred for a further 45 minutes at 120°, by which time its epoxide content was 3.67 equiv.kg.

A prepreg was made from glass cloth and the above product admixed with 2% of benzil dimethyl acetal and 4% of dicyandiamide, irradiating for two seconds with the lamp used in Example 6.

A five-ply laminate was made from 15 cm-square pieces of the prepreg, curing by heating for 1 hour at 170° under a pressure of 2.1 MN/m$^2$. The interlaminar shear strength of the laminate, which consisted of 61.8% of resin and 38.2% of glass, was 22.6 MN/m$^2$, and was still 22.1 MN/m$^2$ after the laminate had been immersed for 2 hours in boiling water.

EXAMPLE 17

1-Phenoxy-2-hydroxypropyl acrylate was made by adding 44.1 g of acrylic acid over 30 minutes to 100 g of phenyl glycidyl ether (epoxide content 6.13 equiv./kg), stirred at 130° in the presence of 0.3 g of tetramethylammonium chloride and 0.2 g of hydroquinone, and stirring at 120° for a further two hours, by which time the epoxide content of the product was negligible.

This acrylate was mixed with an advanced diglycidyl ether of 2,2-bis(4-hydroxyphenyl)propane (epoxide content 2.2 equiv./kg) in the ratio 30:70, and to this mixture was added 2% of benzil dimethyl acetal and 4% of dicyanidiamide.

A prepreg and then a 5-ply laminate were made as described in Example 16, but irradiating for 10 seconds. The laminate, comprising 48% of resin and 52% of glass, had an interlaminar shear strength of 38.8 MN/m$^2$, which was still 34.5 MN/m$^2$ after the laminate had been immersed in boiling water for 2 hours.

In another experiment, a prepreg was prepared in a similar manner but there were used 65 parts of the epoxide resin, 30 parts of 1-phenoxy-2-hydroxypropyl acrylate, and 5 parts of 2-hydroxyethyl acrylate, irradiating for 5 seconds.

From the prepreg a six-ply laminate, consisting of 49% of resin and 51% of glass was prepared: its interlaminar shear strength was 50.6 MN/m$^2$.

EXAMPLE 18

1-Phenoxy-2-hydroxypropyl acrylate, containing some unchanged phenyl glycidyl ether, was prepared as described in Example 17 but adding the acrylic acid over 15 minutes and stirring for only one hour.

The product, which had an epoxide content of 0.99 equiv./kg and a viscosity at 25° of 95 mPas, was mixed at 80° with 2.3 parts of an epoxide resin containing 2.1 epoxide equiv./kg, prepared by advancing 2,2-bis(4-glycidyloxyphenyl)propane with 2,2-bis(3,5-dibromo-4-hydroxyphenyl)propane, and to this composition was added 2% of benzil dimethyl acetal and 4% of dicyandiamide. A glasscloth prepreg was prepared and irradiated, and from this a five-ply laminate was made as described in Example 16. The laminate (comprising 32% of resin and 68% of glass) had an interlaminar flexural strength of 472 MN/m$^2$: after the laminate had been immersed for 2 hours in boiling water, the interlaminar flexural strength was 385 MN/m$^2$.

EXAMPLE 19

1-Diethylphosphonomethyl-3-glycidyl-5,5-dimethylhydantoin of epoxide content 2.97 equiv./kg (100 g) was stirred at 120° with 0.3 g of tetramethylammonium chloride and 0.2 g of hydroquinone while 21.4 g of acrylic acid (1.15 equiv. per epoxide equiv.) was added over 15 minutes. Stirring was continued for a further 45 minutes at 120°, by which time the epoxide content of the mixture was 0.83 equiv./kg.

The phosphorus-containing acrylate so obtained, consisting substantially of 3-(1-diethylphosphonomethyl-5,5-dimethylhydantoin-3-yl)-2-hydroxypropyl acrylate (12 g), 18 g of 3-phenoxy-2-hydroxypropyl acrylate and 70 g of the advanced epoxide resin employed in Example 18, were mixed and to the mixture were added dicyandiamide (4%) and benzil dimethyl acetal (2%). A prepreg and then a six-ply laminate were made as described in Example 1. The laminate was tested for flammability according to Specification UL 84 (Second Edition) of an independent organisation, Underwriting Laboratories Inc., USA, and was classified as 94V-O, i.e., as meeting the most exacting standard for resistance to burning.

In aother experiment a six-ply laminate was made similarly, employing 6 g, instead of 12 g, of the phosphorus-containing acrylate, 24 g, instead of 18 g, of 3-phenoxy-2-hydroxypropyl acrylate, and 1%, instead of 2%, of benzil dimethyl acetal. The laminate, which comprised 49% of resin and 51% of glass, had an interlaminar flexural strength of 386 MN/m$^2$.

EXAMPLE 20

A product, consisting substantially of 1-n-butoxy-2-hydroxypropyl acrylate, was prepared by adding 27.6 g of acrylic acid (1 equiv. per epoxide group) over 15 minutes to a stirred mixture at 120° of 50 g of n-butyl glycidyl ether (epoxide content 7.65 equiv./kg), 0.15 g of tetramethylammonium chloride, and 0.05 g of hydroquinone. After the mixture had been stirred for 3 hours longer at 120°, its epoxide content had fallen to 0.6 equiv./kg.

To 30 parts of the product was added the bromine-containing, advanced epoxide resin employed in Example 17 (70 parts) together with 1% of benzil dimethyl acetal and 4% of dicyandiamide, and a prepreg and then a six-ply laminate were prepared as described in Example 18. The flexural strength of the laminate, which comprised 23.1% of resin and 76.9% of glass, was 206 MN/m$^2$.

EXAMPLE 21

A mixture of 1-n-octyloxy-2-hydroxypropyl and 1-n-decyloxy-2-hydroxypropyl acrylate was prepared as described in Example 20 from 100 g of a commercially available mixture of n-octyl and n-decyl glycidyl ethers (epoxide content 4.32 equiv./kg) and 31.1 g of acrylic acid, and stirring, when all the acrylic acid had been added, for 1¾ hours, by which time the epoxide content of the mixture had fallen to 0.71 equiv./kg.

The procedure of the second part of Example 20 was repeated, substituting 30 parts of the mixed acrylates for the 30 parts of 1-n-butoxy-2-hyroxypropyl acrylate. The resultant laminate had a flexural strength of 210

MN/m² and consisted of 33.6% of resin and 66.4% of glass.

EXAMPLE 22

A composition comprising 70 parts of a polyglycidyl ether of 2,2-bis(4-hydroxyphenyl)propane used in Example 17, 30 parts of 1-phenoxy-2-hydroxypropyl acrylate, 4 parts of dicyandiamide, 1 part of 1-(p-chlorophenyl)-3,3-dimethylurea (as accelerator for dicyandiamide), and 1 part of benzil dimethyl acetal was applied at 70° through a silk screen to tows of carbon fiber (134 tows per cm, weight of tow 0.2 g/m): the coated fibres were subjected to slight pressure at 100° for 1 minute to obtain their complete impregnation. The impregnated tows were irradiated on each face for 30 seconds with a lamp as described in Example 6, and an 8-ply laminate was made from the prepreg, heating at 125° for 1 hour under a pressure of 0.7 MN/m². The laminate, which consisted of 48% of resin and 52% of fibre, had a flexural strength of 1638 MN/m².

Similar results were obtained when the benzil dimethyl acetal was replaced by 2 parts of benzoin n-butyl ether.

EXAMPLE 23

A poly(oxyethylene) disorbate was prepared by adding 130.5 g of sorbyl chloride over 30 minutes to a stired mixture of 100 g of a poly(oxyethylene) glycol, average molecular weight 200, 110 g of triethylamine, and 500 ml of toluene at room temperature, stirring for 1 hour at 80°, cooling, filtering, and then removing the toluene under reduced pressure.

A carbon fiber prepreg was made as described in Example 22, employing a composition comprising 70 parts of an advanced diglycidyl ether of 2,2-bis(4-hydroxyphenyl)propane having an epoxide content of 2.2 equiv./kg, 30 parts of the above disorbate, 4 parts of dicyandiamide, and 1 part of Michler's ketone, and irradiating the prepreg on each face for 15 minutes. A good six-ply laminate was prepared from the prepreg, heating for 1 hour at 180° under 2.1 MN/m² pressure.

A laminate was made from poly(p-phenylene terephthalamide) fibres in the same way.

EXAMPLE 24

3-Phenoxy-2-hydroxypropyl acrylate was prepared as described in Example 17 except that the acrylic acid was added over 1 hour at 100°, 2,6-di-tert. butyl-p-cresol was used in place of hydroquinone, and the mixture was heated for 4 hours at 100° after the acrylic acid had been added.

Glass cloth was impregnated at 60° with a composition comprising the acrylate so prepared (30 parts), 28 parts of 2,2-bis(4-glycidyloxyphenyl)-propane (epoxide content 5.2 equiv./kg), 42 parts of an advanced diglycidyl ether of 2,2-bis(4-hydroxyphenyl)propane having an epoxide content of 2.1 equiv./kg, 1 part of 2-ethyl-4-methylimidazole, and 1 part of benzil dimethyl acetal, irradiating for 30 seconds, and from the prepreg a nine-ply laminate was made, curing at 170° for 1 hour under a pressure of 2.1 MN/m². The laminate had a flexural strength of 524 MN/m². On being laminated to copper, for making a printed circuit, the laminate showed good peel strength.

EXAMPLE 25

A good prepreg was made, following the procedure of Example 24 but using 22.5 parts, instead of 30, of 3-phenoxy-2-hydroxypropyl acrylate and including 7.5 parts of glycidyl methacrylate.

EXAMPLE 26

The procedure of Example 24 was repeated, half the 3-phenoxy-2-hydroxypropyl acrylate being replaced by an equimolar amount of the methacrylate.

I claim:

1. A method for the preparation of prepregs which comprises
   i. impregnating a fibrous reinforcing material with a liquid composition containing an epoxide resin and a photopolymerisable compound which is an acrylic ester containing, attached to an organic group of at least 5 carbon atoms, at least one group of formula

$CH_2=C(R^3)COO-$ or

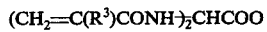

$(CH_2=C(R^3)CONH)_2CHCOO$ or

$CH_2=C(R^3)CONHCH(OH)CH_2COO-$ wherein $R^3$ is a hydrogen, chlorine, or bromine atom or an alkyl hydrocarbon group of 1 to 4 carbon atoms, in the molar ratio of from 1:10 to 10:1, and with a heat-activated curing agent for epoxide resins, and
   ii. in the absence of a substance which gives rise to a substantial degree of photoinduced polymerisation through consumption of epoxide groups, exposing the impregnated material to actinic radiation such that the composition solidifies due to photopolymerisation of the said photopolymerisable compound while the epoxide resin remains substantially in the thermosettable state.

2. The method of claim 1, in which the epoxide resin, the photopolymerisable compound, and the said curing agent together constitute from 20 to 80% by weight of the prepreg.

3. The method of claim 1, in which the epoxide resin contains at least one group of formula

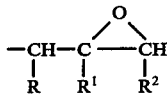

directly attached to an atom of oxygen, nitrogen, or sulfur, where either R and $R^2$ each represent a hydrogen atom, in which case $R^1$ denotes a hydrogen atom or a methyl group, or R and $R^2$ together represent $-CH_2CH_2-$, in which case $R^1$ denotes a hydrogen atom.

4. The method of claim 1, in which the heat-activated curing agent is a polycarboxylic acid anhydride, dicyandiamide, a complex of an amine with boron trifluoride or boron trichloride, a latent boron difluoride chelate, an aromatic polyamine, or an imidazole.

5. The method of claim 1, in which the photopolymerisable compound does not contain a 1,2-epoxide group.

6. The method of claim 1, in which the fibrous reinforcing material is also impregnated with a dual-functional substance having in the same molecule both at least one 1,2-epoxide group and at least one group of formula

or

or

where $R^3$ is as defined in claim 1.

7. The method of claim 6, in which the dual functional substance contains in the same molecule at least one group of formula

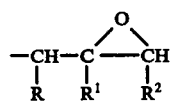

directly attached to an atom of oxygen, nitrogen, or sulfur, and at least one group of formula

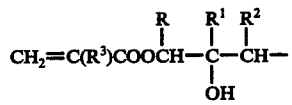

or

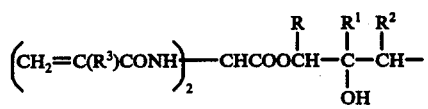

or

directly attached to an atom of oxygen, nitrogen, or sulfur, where either R and $R^2$ each represent a hydrogen atom, in which case $R^1$ denotes a hydrogen atom or a methyl group, or R and $R^2$ together represent —$CH_2CH_2$—, in which case $R^1$ denotes a hydrogen atom, and $R^3$ is a hydrogen, chlorine, or bromine atom or an alkyl hydrocarbon group of 1 to 4 carbon atoms.

8. A method according to claim 1, in which the acrylic ester has the general formula

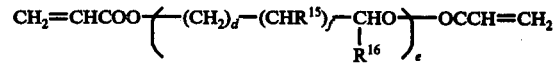

where
 $d$ is an integer of 1 to 8,
 $e$ is an integer of 1 to 20,
 $f$ is zero or 1,
 $R^{15}$ denotes —H, —OH, or —OOCCH=$CH_2$, and
 $R^{16}$ denotes —H, —$CH_3$, —$C_2H_5$, —$CH_2OH$, or —$CH_2OOCCH$=$CH_2$.

9. A method according to claim 1, in which the acrylic ester has the general formula

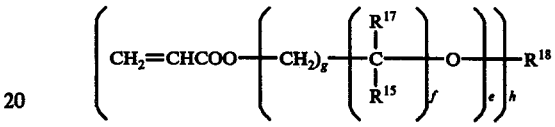

where
 $e$ is an integer of 1 to 20,
 $f$ is zero or 1,
 $g$ is zero or a positive integer, provided that $f$ and $g$ are not both zero,
 $h$ is 1, 2, 3, or 4,
 $R^{15}$ denotes —H, —OH, or —OOCCH=$CH_2$,
 $R^{17}$ denotes —H, —Cl, —$CH_3$, or —$C_2H_5$, and
 $R^{18}$ denotes an organic radical of valency $h$ linked through a carbon atom or carbon atoms thereof to the indicated $h$ terminal oxygen atoms.

10. A method according to claim 1, in which the acrylic ester has the general formula

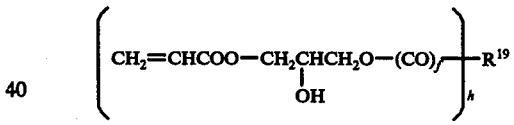

where
 $f$ is zero or 1,
 $h$ is 1, 2, 3, or 4, and
 $R^{19}$ denotes an organic radical of valency $h$, linked through a carbon atom thereof other than the carbon atom of a carbonyl group.

11. A method according to claim 1, in which the acrylic ester has the general formula

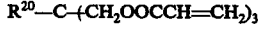

where
 $R^{20}$ denotes $CH_2$—, $C_2H_5$—, or CH=CHCOOCH$_2$—.